No. 847,228. PATENTED MAR. 12, 1907.
J. L. BIXBY, Jr.
BELTING.
APPLICATION FILED AUG. 1, 1906.
2 SHEETS—SHEET 1.
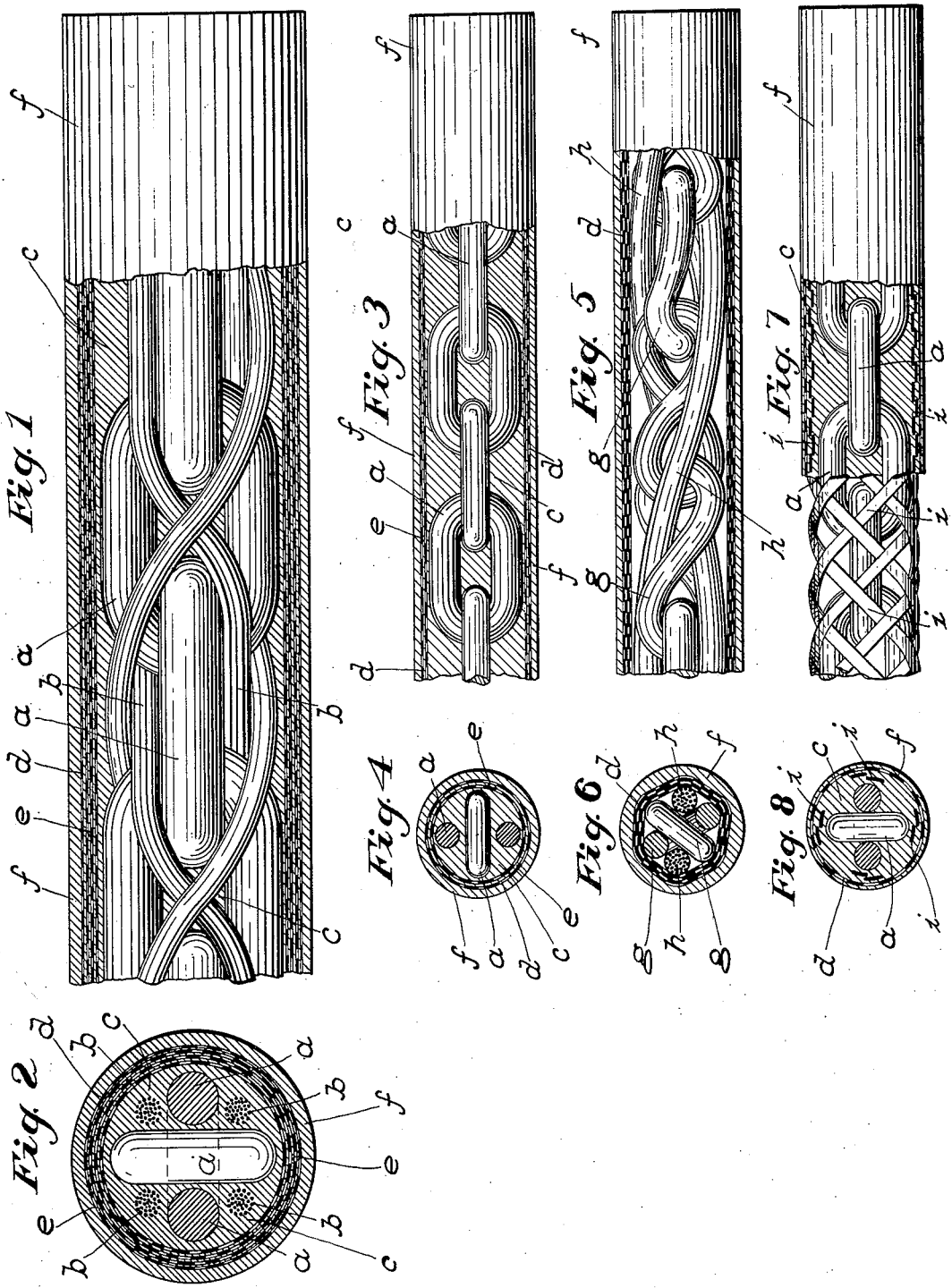
Witnesses
Jesse A. Holton
Laurence C. Janney
Inventor:
John L. Bixby, Jr.
by Emery & Booth,
Atty's

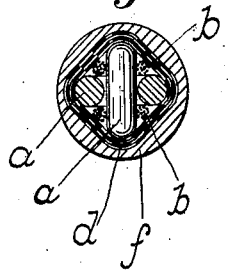
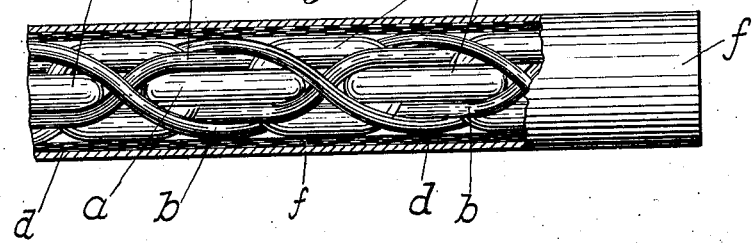
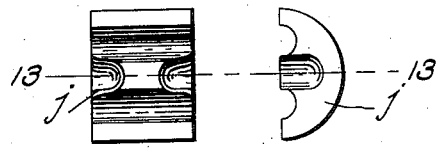
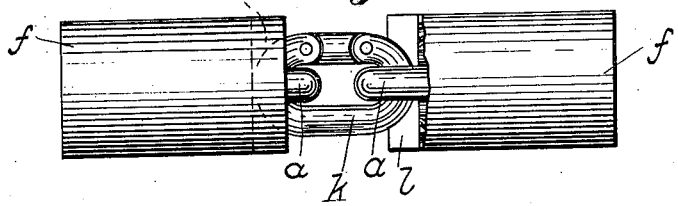
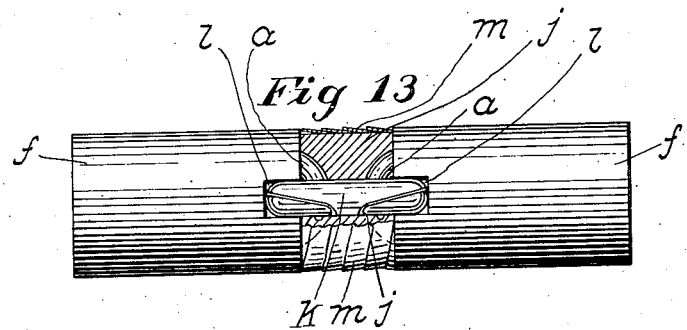

UNITED STATES PATENT OFFICE.

JOHN LEWIS BIXBY, JR., OF RIVER FOREST, ILLINOIS.

BELTING.

No. 847,228.  Specification of Letters Patent.  Patented March 12, 1907.

Application filed August 1, 1906. Serial No. 328,67

To all whom it may concern:

Be it known that I, JOHN LEWIS BIXBY, Jr., a citizen of the United States, residing at River Forest, county of Cook, State of Illinois, have invented an Improvement in Belting, of which the following description, in connection with the accompanying drawings, is a specification, like letters on the drawings representing like parts.

This invention relates to transmission-belting, and is particularly applicable to that which is more or less round in cross-section as distinguished from flat belting.

Hereinafter belting embodying this invention will be designated for convenience "rope belt" to distinguish it from round belting already known and used.

Various attempts have been made heretofore to produce satisfactory round belting; but prior to this invention every such attempt has encountered some practical difficulty, involving the construction or composition of the belt, which has rendered it somewhat unreliable for general commercial use as a substitute for flat belting, such as the ordinary flat-leather or woven belts. For example, it has been attempted to use a round belt composed of a core of cotton or "linen cord" coated with vulcanized rubber or other elastic material; but this arrangement presented many and serious disadvantages. The cord was not sufficiently inextensible longitudinally, and consequently the belt would stretch materially during its use, requiring frequent adjustment to preserve the proper tension. Moreover, this form of cord-and-rubber belt had no provision for readily connecting and disconnecting its ends, which required to be spliced or otherwise connected at a considerable expenditure of time and trouble. It has also been attempted to use a chain incased in a wrapping composed of straps or thongs of leather; but this did not meet with any particular success, for the reason that the leather straps gave to the belt a seggregated surface, the parts of which were likely to stretch, warp, or crawl in such a manner as to give the belt an uneven surface and to permit the exposure of parts of the chain. Furthermore, the links of the chain were likely to wear or cut through the covering, and this was particularly true, because the parts of the covering and the chain, being only loosely associated, were permitted material relative movement, which caused serious wear on the former, such as would not result merely from the pressure of the chain on the covering in the ordinary use of the belt.

Various difficulties other than those enumerated above are obviated by the improvements contemplated by the present invention.

A preferred form of rope belt embodying important features of this invention comprises in general an inextensible member, such as a link chain or the like, strands or groups of strands of wire disposed lengthwise of the chain or its substitute, a wear-resisting protector of fabric or fiber in some form or other encircling or inclosing the chain and wire, and a covering for the whole of rubber or the like. A belt comprising these elements combines the various advantages presented by round belts heretofore known and used to the exclusion of their several faults and in addition presents features of inherent novelty.

The inextensible member, preferably constituting the main core of the rope belt, should be flexible laterally to permit the rope belt readily to accommodate itself to the peripheries of pulleys of any desired size, and for this purpose it is found convenient to employ a link chain. The particular form, shape, or size of the links is immaterial so long as the chain possesses the desired qualifications. Whatever the character of the chain so employed its tendency to break must be reckoned with in producing an entirely practicable belt. The metal of the links is likely to crystallize on occasion, and as a result the chain is likely to snap, especially if it be driven at a high rate of speed under a considerable load. Breakage of the main core of a belt under these circumstances is likely to cause great damage if the remainder of the belt be not sufficiently stable to hold it together until the operation can be arrested and the damage repaired. In order to provide a strong part of the belt auxiliary to the main core and in order to increase the general strength of the belt without impairing its flexibility, it is considered desirable to employ, in connection with the chain or its equivalent strands of wire, rope, or fiber arranged singly or in groups and disposed in any practicable manner in the interior of the rope belt.

In order to give to the preferred form of core a continuous and uniform surface and in order to make the core somewhat yielding and at the same time to assist in maintaining the chain and wire in their proper mutual relations, it is preferred to mold or otherwise to incase the chain and wire in a bed of rubber or the like. This bed of rubber or filler is preferred to be approximately cylindrical, though its shape is comparatively immaterial.

Whatever may be the construction of the core, if it comprise a link chain or any series of individually rigid parts connected to form a laterally-flexible whole, said rigid parts will tend to wear or cut through any covering in which they may be inclosed. This arises largely from the fact that the covering tends to accommodate itself to the curve of a pulley which it engages, while each of the chain-links or their equivalents occupies a generally tangential relation to the pulley and the extremities of the link tend to work their way through the covering. In order to diminish this injurious tendency, it is preferred to encircle the core of the rope belt by a wear-resisting protector of fabric or fiber in some form or other, thereby presenting tough material to obstruct the wearing through of the chain-links. What is considered the best embodiment of this particular feature of the invention comprises a series of substantially coaxial cylinders of circularly-knitted fabric. This may, however, if desired, be replaced by one or more strips or layers of fiber or fabric.

In order to give the rope belt a desirable unity of construction and in order to provide an effective friction-surface, a coating of rubber or similar material is applied to the exterior of the core and the layers of fabric or the like, and also it is thought best to apply a similar covering after the application of each layer of fabric if there be a plurality, thus providing a yielding cushion between adjacent layers which serves to take up a considerable amount of the wear.

In the accompanying drawings, Figures 1 and 2 are respectively a side elevation, partly broken away, and a transverse section of a preferred form of rope belt. Figs. 3 and 4 are respectively a side elevation, partly broken away, and a transverse section of a form of rope belt, omitting the strands of wire or the like illustrated in Figs. 1 and 2. Figs. 5 and 6 are respectively a side elevation, partly broken away, and a transverse section of rope belt having a core which comprises a twisted-link chain and two wire ropes. Figs. 7 and 8 are respectively a side elevation, partly broken away, and a transverse section of rope belt having a straight-link chain inclosed in a sort of lattice-work of flat wires. Figs. 9 and 10 are respectively a side elevation, partly broken away, and a transverse section of rope belt similar to that shown in Figs. 1 and 2, but omitting the rubber filler shown in said figures. Fig. 11 comprises a side view and an end view of a convenient form of filler-block, two of which are intended to be placed face to face on opposite sides of a connecting-link, by which the free ends of the chain are secured together. Fig. 12 is a side elevation, partly broken away, showing the manner of connecting the free ends of the chain by means of a split link. Fig. 13 is a top view of the connected ends of the chain viewed in Fig. 12, showing the filler-blocks in position, one block being shown in section on the line 13 13 of Fig. 11 and the other being shown in edge view. Figs. 1 and 2 are drawn to approximately twice the scale of the other figures.

Referring to Figs. 1 and 2, which illustrate the preferred form of rope belt, the chain $a$ is an ordinary straight-link chain, having disposed lengthwise in the angles formed by its links a plurality of groups of strands $b$, preferably of wire. The interstices between the links and strands are occupied by a filler $c$, of rubber, which is preferred also completely to inclose the chain $a$ and the strands $b$, thus forming a core of uniform size. Encircling the core so formed are a plurality of layers $d\ d$, of circularly-knitted fabric having strong texture, constituting one form of wear-resisting protector. One of the layers $d$ is preferably superposed directly upon the surface of the rubber filler, thereafter a coating of rubber or similar yielding material is applied to said layer, a second layer $d$ is superposed upon said coating, and so on until the desired number of layers of fabric have been applied. Thus the coatings of rubber or the like intervening between adjacent layers of fabric or other wear-resisting material supply yielding cushions $e$. The outermost layer $b$ is preferably encircled by a covering $f$, of rubber, presenting a continuous unitary surface having a high coefficient of friction to permit effective adhesion between belt and pulley for communicating power to or from the latter. With an arrangement such as has been described the material of the filler $c$, of the cushions $e$, and of the covering $f$ may be applied in such a manner or in such a state of plasticity as to permeate or to pass through the layer or layers $d\ d$ if the latter be meshed or have apertures or interstices of any sort, and in this way said filler $c$, cushions $e$, and covering $f$, or some of them if others be omitted, may be welded together or otherwise amalgamated, with the result that, in effect, the chain $a$ or its equivalent in the combination is inclosed in an enveloping medium in which a layer or layers $d\ d$ are embedded.

The form of rope belt just described is particularly desirable. The chain is of course inextensible and laterally flexible, thus precluding any stretching of the belt, while permitting it free engagement laterally with driving and driven pulleys. The strands $b$ are of sufficient number and strength not only to contribute to the general strength of the rope belt as a whole, but are stable enough to prevent the complete disruption of the rope belt in the event of breaking the chain. The filler c serves to cushion the relative movement of the links of the chain and the strands b and to provide a unitary yielding core. The layers d of fabric inclose the core and being preferably tough resist both wear from within the belt and that resulting from outside friction. The rubber cushions e yieldingly reinforce the adjacent layers d, and thereby shield the latter from the destructive wear which might result if said layers d were interposed directly between the core and the rigid surface of a pulley. The exterior covering f supplies a continuous unitary surface of uniform dimensions and being preferably of rubber or the like supplies a good gripping-surface. It might be practicable to dispense with the outer covering of rubber and have the surface of the rope belt supplied by a layer of meshed fabric or the like; but this is not preferred.

Referring to Figs. 3 and 4, the rope belt here shown has in common with that shown in Figs. 1 and 2 a straight-link chain a, a filler c, layers d of fabric or the like, cushions e, and a covering f. This view, however, illustrates a construction of rope belt wherein the strands b are omitted. While this does not constitute the preferred embodiment of the invention, it is a practicable form and may be used under some circumstances when the reinforcing office of the strands is unnecessary. It is to be understood that the form of rope belt shown in Figs. 3 and 4 supplies all the advantages enumerated above in connection with the form shown in Figs. 1 and 2, save that in the former the strand or strands b are lacking, and therefore do not contribute their desirable characteristics.

Referring to Figs. 5 and 6, the rope belt is shown as having a twisted-link chain g, which serves the same purposes as the chain a in the previous figures. In such a chain g the successive twists of the links form, so to speak, two continuous spiral grooves, and in each of these grooves is placed a strand or collection of strands h, of wire, rope, fiber, or the like. These strands, combined with the chain, have a roughly-cylindrical exterior, and consequently it is convenient, if desired, to omit here the filler c, shown in the previous figures. This filler may, however, in appropriately-modified form be employed in connection with this construction.

Figs. 7 and 8 show rope belt comprising a straight-link chain a. Encircling the chain is a sort of lattice-work of flat wires i. These wires and the chain a are embedded in a rubber filler c, and the core so formed is provided with layers d of fabric or the like and a covering f of rubber. The flat wires i are supplied as a convenient alternative to the strands b. (Shown in Fig. 1.) Also said wires serve to assist the fabric layers in connection with their wear-resisting office.

As shown in Figs. 9 and 10, the combined chain a and strands b are not provided with a filler such as the filler c in Figs. 1 and 2; but said chain and strands are covered immediately by wear-resisting layers d, which in turn have cushions e, of rubber, and an exterior covering f.

Fig. 11 shows one of a pair of twin filler-blocks j j, arranged to be placed face to face, so as to embrace between them a split link k, Fig. 12, by means of which the ends of the chain are fastened together. The split link k engages the adjacent ends of two of the links of the chain, and the surrounding body of the rope belt at each end of the split link is traversed by a radially-disposed slot l, in which the link fits and which facilitates the insertion of the link. Preferably the diameter of the combined filler-blocks j j when they are assembled is slightly less than that of the rope belt itself. This permits the filler-blocks to be wrapped about by adhesive tape m or the like without increasing the diameter of the belt and causing unevenness in its surface at the point where its ends are joined together.

Rope belt embodying this invention has many advantages other than those particularly pointed out herein by way of illustration, which will be readily recognized.

It is to be understood that the present invention is not limited in the scope of its application to the specific preferred form and modifications shown and described herein, since various further changes and modifications within the proper field of this invention will appear to those familiar with the art. All such changes and modifications are to be construed as included within the scope of the invention as it is defined in the subjoined claims.

In another application filed by me February 14, 1906, Serial No. 301,086, I claim a rope belt having in combination an inextensible and laterally-flexible member, a plurality of auxiliary strengthening-strands and a covering surrounding the same, and also a construction composed of the linked chain flexible in all directions with the filling arranged upon the links so as to fill out the angles thereof and make the cross-section substantially uniform throughout its length, and the covering surrounding the chain and filling to hold them in proper relation and furnish a suitable surface for the coöperating pulley, whereas in the present application

What I claim is—

1. Rope belt having, in combination, an inextensible and laterally-flexible member; a flexible covering therefor presenting a continuous unitary surface; and a wear-resisting protector interposed between said member and the covering.

2. Rope belt having, in combination, an inextensible and laterally-flexible member; a covering therefor presenting an integral surface; and a layer of fabric interposed between said member and the covering.

3. Rope belt having, in combination, an inextensible and laterally-flexible member; a continuous flexible covering to protect said member externally; and a layer of knitted fabric interposed between said member and the covering and supplying a continuous wear-resisting protector therebetween.

4. Rope belt having, in combination, a chain; an enveloping medium; and a layer of wear-resisting material embedded in said medium.

5. Rope belt having, in combination, an inextensible and laterally-flexible member; auxiliary strengthening means to reinforce said member; a yielding covering for the whole; and a wear-resisting protector interposed between the covering and said member.

6. Rope belt having, in combination, an inextensible and laterally-flexible member; an auxiliary strand to reinforce said member; a yielding covering for the whole; and a layer of fabric interposed between the covering and said member.

7. Rope belt having, in combination, a chain; auxiliary strengthening means to reinforce the chain; an enveloping medium for the whole; and a layer of knitted fabric embedded in said medium.

8. Rope belt having, in combination, inextensible means constituting the main body of the core; wear-resisting material encircling said means; and rubber in the interstices of said means and said material.

9. Rope belt having, in combination, a chain; a filler of pliable material; a wear-resisting protector encircling the filler; and a yielding covering for the whole.

10. Rope belt having, in combination, a chain; a covering therefor; a split link for connecting the ends of the chain; and a covering for the split link.

11. Rope belt having, in combination, a chain; a split link for connecting the ends of the chain; and removable means for covering said split link and preserving the continuity of the surface of the rope belt.

12. Rope belt having, in combination, a chain $a$; strands $b$; a filler $c$; and a layer $d$.

13. Rope belt having, in combination, a chain $a$; a plurality of layers $d$; and cushions $e$.

14. Rope belt having, in combination, a chain $a$; a plurality of layers $d$; and covering $f$.

15. Rope belt having, in combination, a chain $a$; an enveloping medium; and a layer $d$ embedded therein.

16. Rope belt having, in combination, a chain $a$; pliable material enveloping the chain; and a plurality of layers $d$ embedded in said material and spaced apart therein.

17. Rope belt having, in combination, a chain $a$; a rubber compound enveloping the chain; and a layer $d$ embedded in said rubber compound.

18. A rope belt, having in combination a chain; a plurality of auxiliary strengthening-strands, and a wear-resisting protector to oppose the wear of the chain, and a continuous unitary outer covering.

19. A rope belt having in combination, an inextensible and laterally-flexible member, a wear-resisting protector, and a flexible covering contractible and expansible on opposite sides to suit the curvature of a pulley while preserving a continuous surface for the rope belt, the protector serving to reinforce the covering against disruption caused by such contraction and expansion.

In testimony whereof I have signed my name to this specification in the presence of two subscribing witnesses.

JOHN LEWIS BIXBY, JR.

Witnesses:
FREDK. JOHNS,
EDMUND E. ST. PETER.